US008949953B1

(12) United States Patent
 Khitrenovich et al.

(10) Patent No.: US 8,949,953 B1
(45) Date of Patent: Feb. 3, 2015

(54) BROKERING MULTIPLE AUTHENTICATIONS THROUGH A SINGLE PROXY

(75) Inventors: Anton Khitrenovich, Kfar-Yona (IL); Oleg Freylafert, Hod Hasharon (IL); Yedidya Dotan, Newton, MA (US); Lawrence N. Friedman, Arlington, MA (US); Karl Ackerman, Topsfield, MA (US)

(73) Assignee: EMC Corporation, Hopkinton, MA (US)

( * ) Notice: Subject to any disclaimer, the term of this patent is extended or adjusted under 35 U.S.C. 154(b) by 155 days.

(21) Appl. No.: 13/611,919

(22) Filed: Sep. 12, 2012

(51) Int. Cl.
 *H04L 29/06* (2006.01)
(52) U.S. Cl.
 USPC ........................................ 726/5; 726/2; 726/4
(58) Field of Classification Search
 USPC .............................................................. 726/5
 See application file for complete search history.

(56) References Cited

U.S. PATENT DOCUMENTS

| 8,006,289 | B2* | 8/2011 | Hinton et al. ...................... 726/5 |
| 8,370,389 | B1 | 2/2013 | Dotan | |
| 8,370,899 | B2 | 2/2013 | Shoval et al. | |
| 2004/0107360 | A1* | 6/2004 | Herrmann et al. ............ 713/201 |
| 2005/0097320 | A1* | 5/2005 | Golan et al. ................... 713/166 |
| 2009/0158392 | A1 | 6/2009 | Hughes et al. | |
| 2010/0269149 | A1* | 10/2010 | Lee et al. .......................... 726/1 |
| 2011/0314532 | A1* | 12/2011 | Austin et al. ...................... 726/8 |
| 2012/0144461 | A1* | 6/2012 | Rathbun ............................. 726/5 |
| 2013/0031623 | A1 | 1/2013 | Sanders | |
| 2013/0073463 | A1* | 3/2013 | Dimmick et al. ............... 705/44 |
| 2014/0040139 | A1* | 2/2014 | Brudnicki et al. .............. 705/44 |

OTHER PUBLICATIONS

Andrew Hay, Nokia Firewall, VPN, and IPSO Configuration Guide, ISBN: 9781597492867 ,year 2009, ACM.*
Li Hua-Li, Notice of Retraction PPP Security Mechanism Analysis and Improvement , year 2010, DOI: 10.1109/NSS.2009.80, IEEE Conference.*
Avni, et al., "Knowledge-Based Authentication for Restricting Access to Mobile Devices," U.S. Appl. No. 13/434,991, filed Mar. 30, 2012.
Dotan, Yedidya, "Controlling Access to a Protected Resource Using a Virtual Desktop and Ongoing Authentication," U.S. Appl. No. 13/246,023, filed Sep. 27, 2011.
Dotan, et al, "Establishing a Trusted Session From a Non-Web Client Using Adaptive Authentication," U.S. Appl. No. 13/336,570, filed Dec. 23, 2011.

(Continued)

*Primary Examiner* — Bradley Holder
*Assistant Examiner* — Gita Faramarzi
(74) *Attorney, Agent, or Firm* — BainwoodHuang

(57) ABSTRACT

A method includes (a) receiving, from an application server, a login message for a user, the login message including a user credential for a credential-based authentication (CBA), (b) forwarding the user credential to a CBA server for the CBA, (c) in response, receiving, an authentication decision message from the CBA server, (d) sending decision information from the authentication decision message received from the CBA server to a risk-based authentication (RBA) server, the RBA server being distinct from the CBA server, the decision information to be used by the RBA server in performing RBA authentication decisions, (e) if the authentication decision message is positive, then sending a challenge message to the application server to initiate RBA to be performed by the RBA server supplementary to the CBA, and (f) if the authentication decision message is negative, then sending a rejection message to the application server.

19 Claims, 7 Drawing Sheets

(56) References Cited

OTHER PUBLICATIONS

Dotan, et al., "Multi-Point Collection of Behavioral Data Relating to a Virtualized Browsing Session With a Secure Server," U.S. Appl. No. 13/246,457, filed Sep. 27, 2011.

Dotan, et al., "Techniques for Sharing Authentication Data Among Authentication Servers," U.S. Appl. No. 13/169,668, filed Jun. 27, 2011.

Khitrenovich, et al., "Brokering Multiple Authentications Through a Single Proxy," U.S. Appl. No. 13/611,919, filed Sep. 12, 2012.

Khitrenovich, et al., "Using Packet Interception to Integrate Risk-Based User Authentication Into Online Services," U.S. Appl. No. 13/239,863, filed Sep. 22, 2011.

Peer, et al., "Using Baseline Profiles in Adaptive Authentication," U.S. Appl. No. 13/246,937, filed Sep. 28, 2011.

* cited by examiner

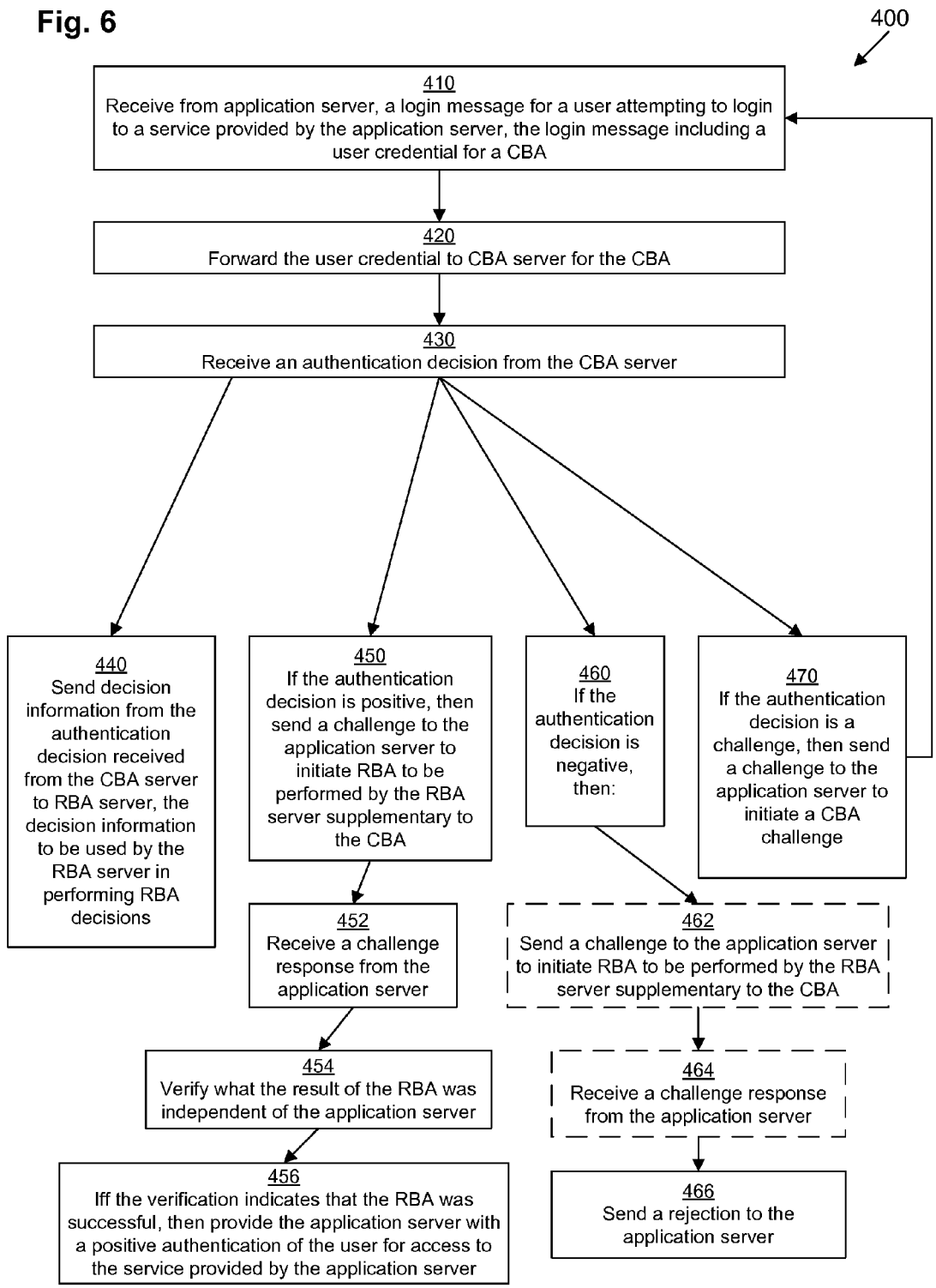

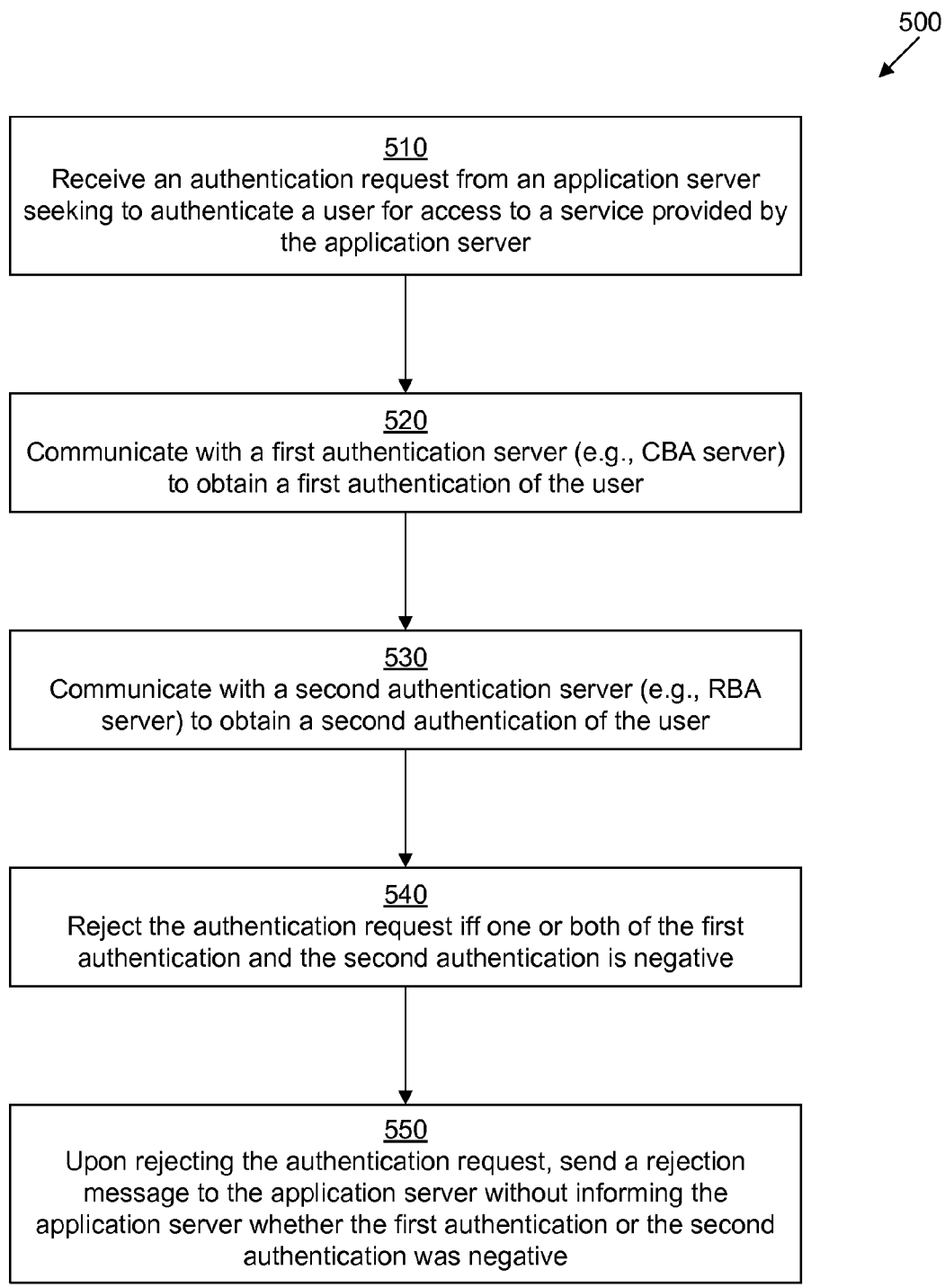

BROKERING MULTIPLE AUTHENTICATIONS THROUGH A SINGLE PROXY

CROSS REFERENCE TO RELATED APPLICATIONS

This Patent Application is related to co-pending U.S. patent application entitled "TECHNIQUES FOR AUTHENTICATING A USER WITH HEIGHTENED SECURITY," filed on even date herewith by Anton Khitrenovich, Oleg Freylafert, and Yedidya Dotan having Ser. No. 13/611,941, the contents and teachings of which are incorporated herein by this reference in their entirety.

BACKGROUND

Application servers, such as virtual private network gateway servers, restrict access by performing user authentication. In one conventional arrangement, the application server delegates responsibility for the authentication to a remote authentication server (e.g., a username/password authentication server) by sending an access request message to the remote authentication server. In another arrangement, after the remote authentication server authenticates the user, the application server initiates supplemental authentication by sending a second access request message to a second remote authentication server or a proxy device.

SUMMARY

The above-described approach may suffer from deficiencies. For example, in the conventional approach, the supplemental authentication is performed by the second remote authentication server only after success of the first authentication. Thus, if a fraudster attempts, from a single client machine, to log in to many different user accounts in a ploy to find an account with an easy-to-crack password, the second remote authentication server will not have knowledge of the failed requests from the same client machine to different accounts. If the supplemental authentication uses a risk-based authentication scheme, it would be useful for the second remote authentication server to have access to the knowledge of the failed attempts because it may signify that the login attempt is a high-risk transaction. However, in conventional approaches, information about these failed attempts is not provided to the second remote authentication server.

As an additional example, if the first authentication is one time password based authentication in which the user has a token that provides a temporary passcode, if the remote authentication server challenges the user to respond with an updated passcode (e.g., due to the use of an old passcode), that challenge information is not provided to the second remote authentication server even if the primary authentication eventually succeeds after several challenges. However, such information may be useful to the second remote authentication server if it performs risk-based authentication because multiple challenges may be indicative of a replay attack.

Thus, embodiments of the invention are directed to techniques for utilizing an authentication broker for contacting multiple authentication servers and sending information gleaned from a first authentication by a first authentication server to a second authentication server for use by that second authentication server. Thus, the application server only needs to communicate with a single device—the authentication broker—to allow for efficient authentication by two authentication servers, the second authentication server being aware of details of the first authentication. These embodiments also provide enhanced security and robustness.

In one embodiment, a method performed by a computing device is described. The method includes (a) receiving, at the computing device from an application server, a login message for a user attempting to gain access to a service provided by the application server, the login message including a user credential for a credential-based authentication (CBA), (b) forwarding the user credential from the computing device to a CBA server for the CBA, (c) in response to forwarding, receiving, at the computing device, an authentication decision message from the CBA server, (d) sending decision information from the authentication decision message received from the CBA server from the computing device to a risk-based authentication (RBA) server, the RBA server being distinct from the CBA server, the decision information to be used by the RBA server in performing RBA authentication decisions, (e) if the authentication decision message is positive, then sending a challenge message from the computing device to the application server to initiate RBA to be performed by the RBA server supplementary to the CBA, and (f) if the authentication decision message is negative, then sending a rejection message from the computing device to the application server. A corresponding apparatus and computer program product are also described.

In another embodiment, a system is described. The system includes (1) a client computer running a login client, the client computer being configured to interact with a user, (2) an application server configured to (a) receive a login request message from the login client running on the client computer, the login request message having a user credential provided by the user upon attempting to gain access to a service provided by the application server and (b) provide the service to the client computer upon successful authentication of the user, (3) an authentication broker computer configured to (a) receive the user credential from the application server, (b) forward the user credential to a credential-based authentication (CBA) server for CBA, (c) in response to forwarding, receive an authentication decision message from the CBA server, (d) send decision information from the authentication decision message received from the CBA server to a risk-based authentication (RBA) server, the RBA server being distinct from the CBA server, the decision information to be used by the RBA server in performing RBA authentication decisions, (e) if the authentication decision message is positive, then send a challenge message to the application server to initiate RBA to be performed by the RBA server supplementary to the CBA, and (f) if the authentication decision message is negative, then send a rejection message to the application server, and (4) an RBA adapter. The application server is configured to (A) deny the service to the client computer upon receiving a rejection message from the authentication broker computer and (B) send a redirect command to the login client running on the client computer upon receiving a challenge message from the authentication broker computer to initiate RBA supplementary to the CBA. The RBA adapter is configured to (I) collect user-specific details including details about the user not available to the application server upon the login client being redirected to the RBA adapter, (II) send the user-specific details to the RBA server, (III) receive a risk-based decision message from the RBA server in response to sending the user-specific details to the RBA server, (IV) inform the authentication broker computer of the risk-based decision, and (V) direct the login client running on the client computer to respond to the application server.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 6 depicts an example method of various embodiments.

FIG. 7 depicts an example method of various embodiments.

DETAILED DESCRIPTION

Embodiments of the invention are directed to techniques for utilizing an authentication broker for contacting multiple authentication servers and sending information gleaned from a first authentication by a first authentication server to a second authentication server for use by that second authentication server. Thus, the application server only needs to communicate with a single device—the authentication broker—to allow for efficient authentication by two authentication servers, the second authentication server being aware of details of the first authentication. These embodiments also provide enhanced security and robustness.

Figure 1:
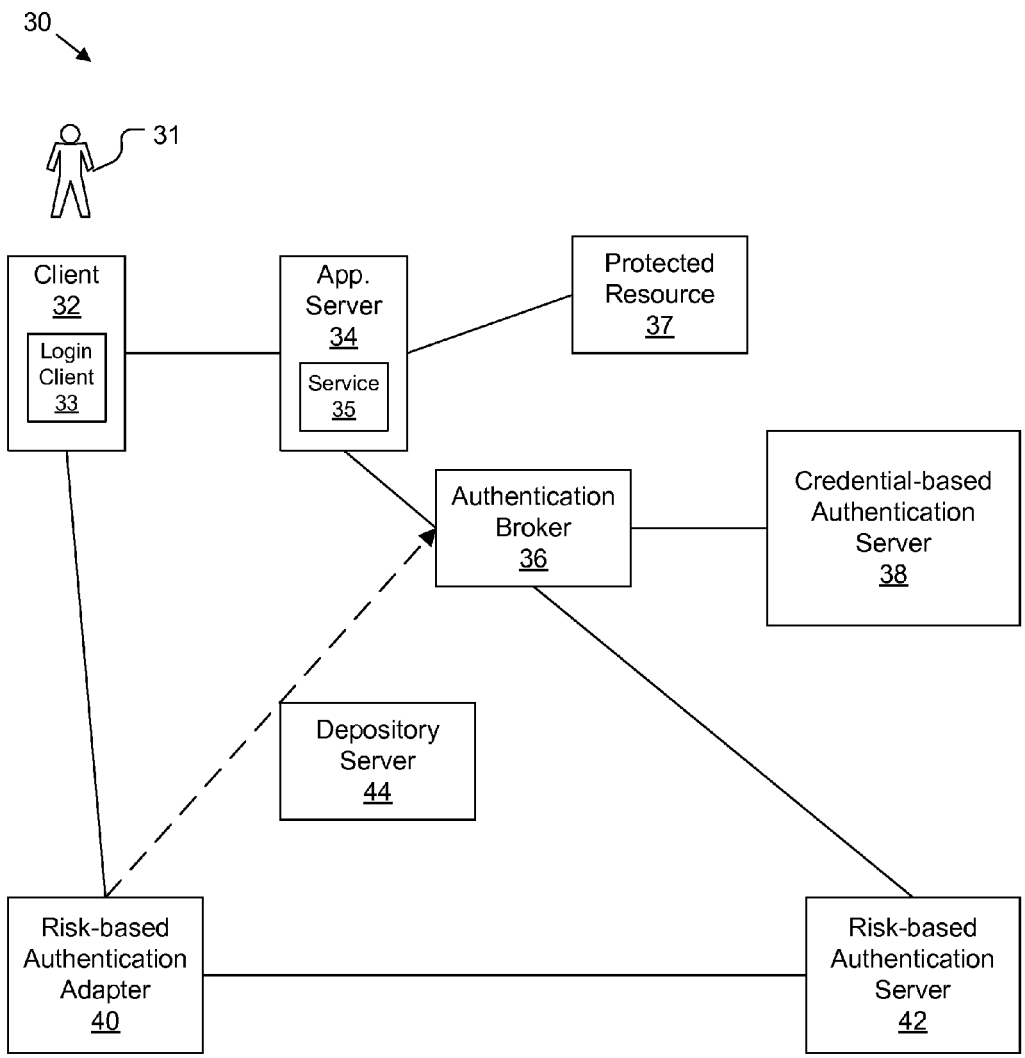
FIG. 1 depicts an example system for use in performing various embodiments.

FIG. 1 depicts an example system 30 for use in performing various embodiments. System 30 includes a client machine 32, an application server 34, an authentication broker machine 36, a credential-based authentication (CBA) server 38, a risk-based authentication (RBA) adapter 40, and an RBA server 42.

Client 32 may be any kind of computing device, such as, for example, a personal computer, a workstation, a server, an enterprise server, a laptop computer, a mobile computer, a smart phone, a tablet computer, etc. A user 31 operates the client 32 in order to attempt to gain access to a service 35 (e.g., a web site, a file share, a virtual private network, etc.) running on or accessible via the application server 34, or to access a protected resource 37 (e.g., a storage array, a camera, a virtual private network, etc.) guarded by the application server 34. For example, the user 31 may desire to access a virtual private network (VPN) accessible via the application server 34 as a VPN gateway. In order to do so, the user 31 executes login client 33 on the client 32 and attempts to log in to the application server 34 to access the VPN or other service 35 or resource 37 using the login client 33. It should be noted that a user 31 accessing a protected resource 37 guarded by the application server 34 may be considered to be a species of the more generic description of a user 31 accessing a service 35 running on or accessible via the application server 34, since the service 35 may include the application server 34 providing a gateway to the protected resource 37.

Application server 34 may be any kind of computing device, such as, for example, a personal computer, a workstation, a server, an enterprise server, a laptop computer, a mobile computer, a smart phone, a tablet computer, etc., although typically application server 34 will be a server or an enterprise server.

Authentication broker 36 may be any kind of computing device, such as, for example, a personal computer, a workstation, a server, an enterprise server, a laptop computer, a mobile computer, a smart phone, a tablet computer, etc., although typically authentication broker 36 will be a server or an enterprise server. Further detail with respect to authentication broker 36 will be provided below in connection with FIG. 2.

CBA server 38 may be any kind of computing device, such as, for example, a personal computer, a workstation, a server, an enterprise server, a laptop computer, a mobile computer, a smart phone, a tablet computer, etc., although typically CBA server 38 will be a server or an enterprise server, such as an RSA SecurID Appliance (produced by RSA, The Security Division of EMC, based in Hopkinton, Mass.) running Authentication Manager software produced by RSA, The Security Division of EMC. CBA server 38 is configured to perform CBA on credentials provided by client 32 via application server 34 and authentication broker 36. For example, user 31 may type a username and password into login client 33 running on client 32. The username and password, in this example, are the credentials that are sent to the CBA server 38 via application server 34 and authentication broker 36. As another example, user 31 may operate a token (for example an RSA SecurID token produced by RSA, The Security Division of EMC) to generate a one-time passcode (OTP). The user 31 may either type the OTP into the login client 33 running on client 32 (possibly together with a username and password) or the token may connect directly to client 32 in order to directly transmit the OTP to the login client 33. In this example, the credentials may include the OTP (as well as, in some embodiments, also the username and password).

RBA adapter 40 may be any kind of computing device, such as, for example, a personal computer, a workstation, a server, an enterprise server, a laptop computer, a mobile computer, a smart phone, a tablet computer, etc., although typically RBA adapter 40 will be a server or an enterprise server. RBA adapter 40 is configured to collect additional data from the user 31 and client 32 in order to pass the additional data on to RBA server 42 in order for RBA to be performed, such as, for example, Adaptive Authentication provided by RSA, The Security Division of EMC. While CBA is a deterministic determination based on the correctness of the credentials, RBA is a complex determination that evaluates a plurality of factors (e.g., number of login attempts, location of the user 31, time since last successful login, time since last login attempt, whether the client 32 has been used for successful logins before, whether the client 32 is known to be used by fraudsters, etc.) associated with a particular transaction (e.g., a login attempt) in order to assess a risk that that particular transaction is fraudulent. In some embodiments, RBA allows for asking a user for more data (e.g., a user-generated challenge question, such as "What high school did you go to?") in suspicious circumstances. In some of these embodiments, this communication of additional data may involve out-of-band communication (e.g., user 31 receives information via e-mail, SMS text message, or telephone and then transmits the received information to the RBA adapter 40 in-band; user 31 is requested to send additional data to the RBA adapter via e-mail, SMS text message, or telephone, etc.) The additional data collected by RBA adapter 40 may include the network address of the client 32, the type and version of the browser and/or login client 33 running on client 32, etc.

RBA server 42 may be any kind of computing device, such as, for example, a personal computer, a workstation, a server, an enterprise server, a laptop computer, a mobile computer, a smart phone, a tablet computer, etc., although typically RBA adapter 40 will be a server or an enterprise server. RBA server 42 is configured to perform RBA, as mentioned above.

The various components 32, 34, 36, 37, 38, 40, 42 of the system 30 communicate with one another along communication paths as indicated by the solid lines in FIG. 1. These communication paths may be of any type, but typically they are network-based, for example, over a local area network, a wide area network, or a storage area network, although other arrangements are possible, such as, for example, point-to-point connections, serial bus connections, or a fabric of hubs and switches.

The dotted line indicates that RBA adapter 40 is configured to communicate an RBA decision to the authentication broker 36, however, this may be done in an indirect manner. For example, RBA adapter 40 sends the RBA decision (which it has received from RBA server 42) to a depository server 44, which stores the RBA decision in conjunction with a username and/or transaction identifier. Authentication broker 36 is then able to query depository server 44 in order to obtain the RBA decision.

Figure 2:
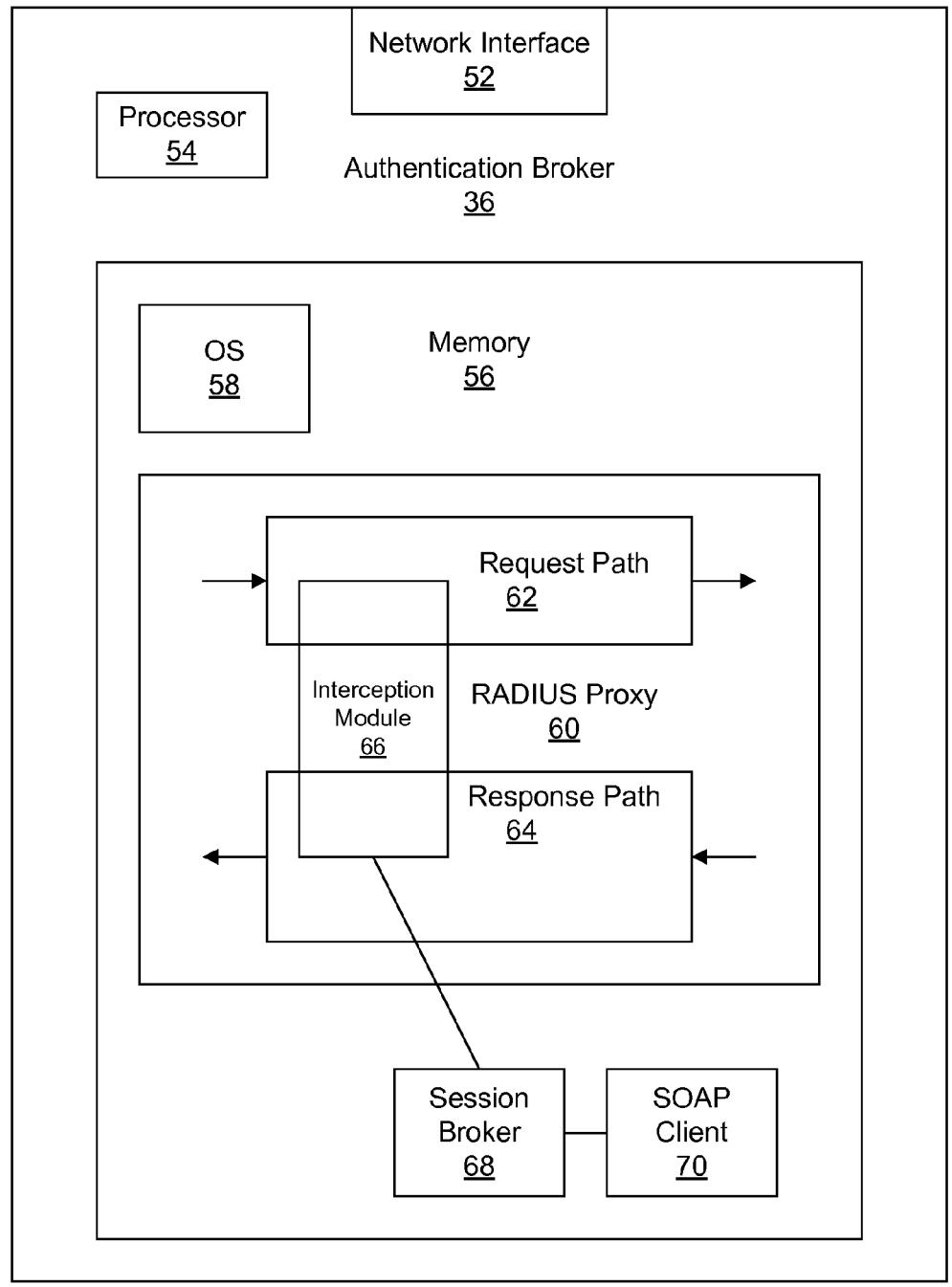
FIG. 2 depicts an example apparatus of various embodiments.

FIG. 2 depicts an example authentication broker 36 in further detail. Authentication broker 36 includes a network interface 52. Authentication broker 36 is able to communicate with application server 34, CBA server 38, RBA server 42, and either depository server 44 or RBA adapter 40 using network adapter 52. In some embodiments, these communications are done over separate network connections, while in other embodiments, one network connection may provide communication with more than one of the application server 34, CBA server 38, RBA server 42, and either depository server 44 or RBA adapter 40.

Authentication broker also contains a processor 54 and memory 56. Processor 54 may be any kind of processor configured to perform operations, such as, for example, a microprocessor, a multi-core microprocessor, a digital signal processor, a collection of electronic circuits, or one or more of the above. Memory 56 may be any kind of digital memory, such as, for example, random access memory, read-only memory, static memory, volatile memory, non-volatile memory, system memory, solid-state storage, disk-based storage, or some combination of the above. Memory 56 stores programs executing on processor 54 as well as data used by those programs. Memory 56 stores an operating system 58, a Remote Authentication Dial In User Service (RADIUS) proxy application 60, a session broker program 68, and a SOAP client program 70, all of which run on processor 54. Memory 56 typically includes both a system memory portion for storing programs and data in active use by the processor 54 as well as a persistent storage portion (e.g., solid-state storage and/or disk-based storage) for storing programs and data even while the authentication broker 36 is powered off. The RADIUS proxy application 60, session broker program 68, and SOAP client program 70 are typically stored both in system memory and in persistent storage so that they may be loaded into system memory from persistent storage upon a system restart. The RADIUS proxy application 60, session broker program 68, and SOAP client program 70, when stored in non-transient form in system memory, form a computer program product. The RADIUS proxy application 60, session broker program 68, and SOAP client program 70, when stored in non-transient form in persistent storage, form a computer program product as well.

Authentication broker 36 is designed to serve as a front-end for various functions, such as, for example, CBA. In order to do so, it includes the functionality of RADIUS proxy 60, whereby it is able to offload CBA tasks to a remote server, such as CBA server 38, which is able to specialize in CBA, while authentication broker 36 is able to perform other tasks. It should be understood that, in some embodiments, the functionality of CBA server 38 may be provided by a CBA application server running on the same machine as authentication broker 36.

RADIUS proxy 60 operates according to the RADIUS protocol, defined by RFC 2865 promulgated by the Internet Engineering Task Force of Fremont, Calif. in June, 2000 and updated by various additional RFCs, such as RFC 2868, RFC 3575, and RFC 5080. The contents and teachings of RFCs 2685, 2868, 3575, and 5080 are incorporated herein by this reference in their entirety. RADIUS proxy 60 contains a request path 62 and a response path 64. Request path 62 receives incoming RADIUS request messages received via network interface 52 from application server 34 and forwards (in some cases with modification) the request messages on towards the CBA server 38 via network interface 52. Response path 64 receives incoming RADIUS response messages received via network interface 52 from CBA server 38 and forwards (in some cases with modification) the response messages on towards the application server 34 via network interface 52. Interception module 66 sits within request path 62 and response path 64 and intercepts certain request messages and response messages for processing by session broker 68. Thus, many RADIUS response messages, upon receipt by response path 64 are intercepted by interception module 66 and sent to session broker 68, which sends details of each particular RADIUS response message to SOAP client 70 to be sent to the RBA server 42 via network interface 52. SOAP client 70 sends information to the RBA server in an XML-based format, such as the SOAP format, version 1.2, promulgated by the World Wide Web consortium of Cambridge, Mass. as a Recommendation on Apr. 27, 2007, the contents and teachings of which are incorporated herein by this reference in their entirety. In addition, RADIUS access-accept and access-reject messages may be converted into access-challenge messages with different parameters by session broker 68 prior to being returned to response path 64.

Figure 3:
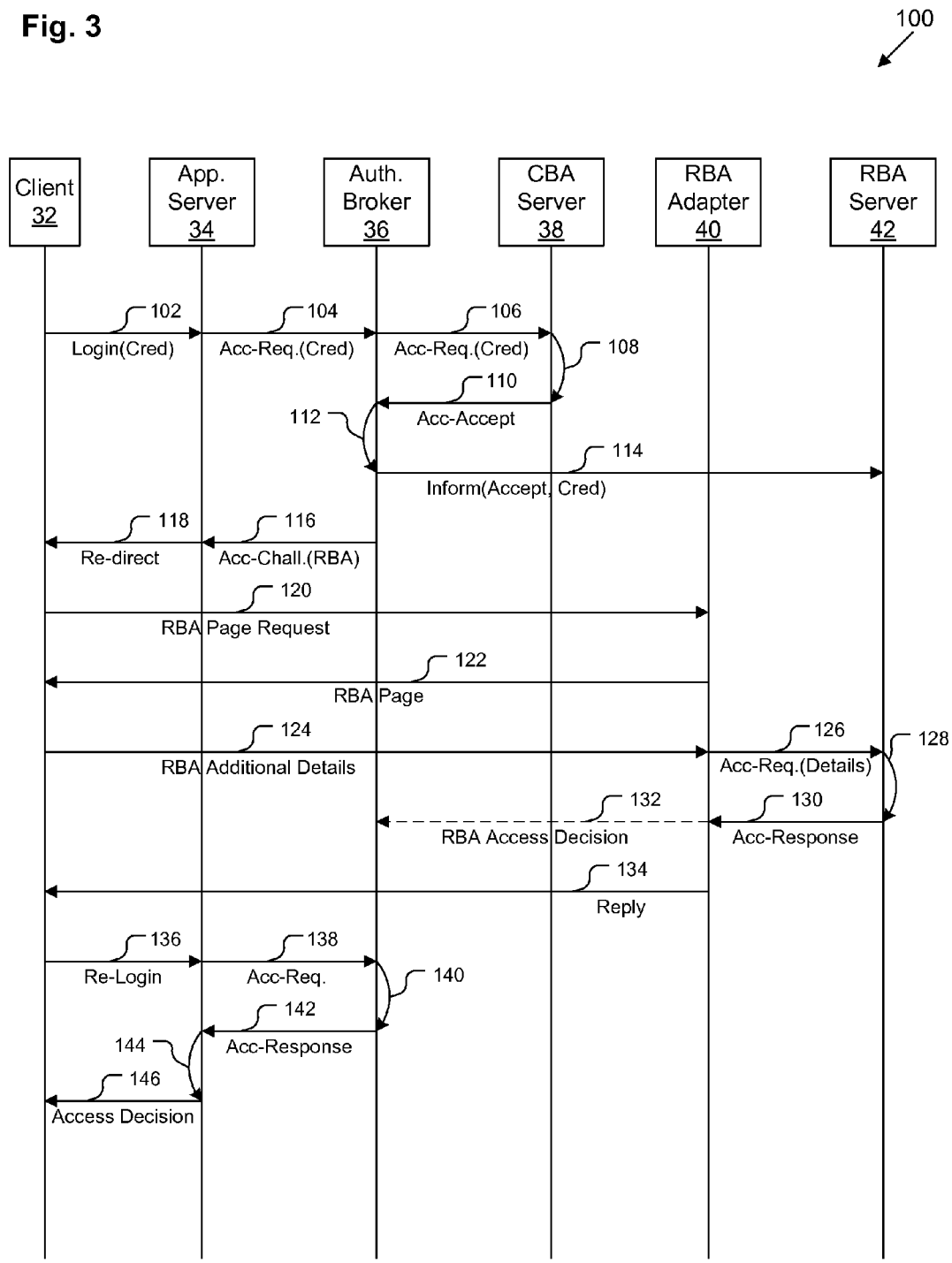
FIG. 3 depicts an example method of various embodiments.
Figure 4:
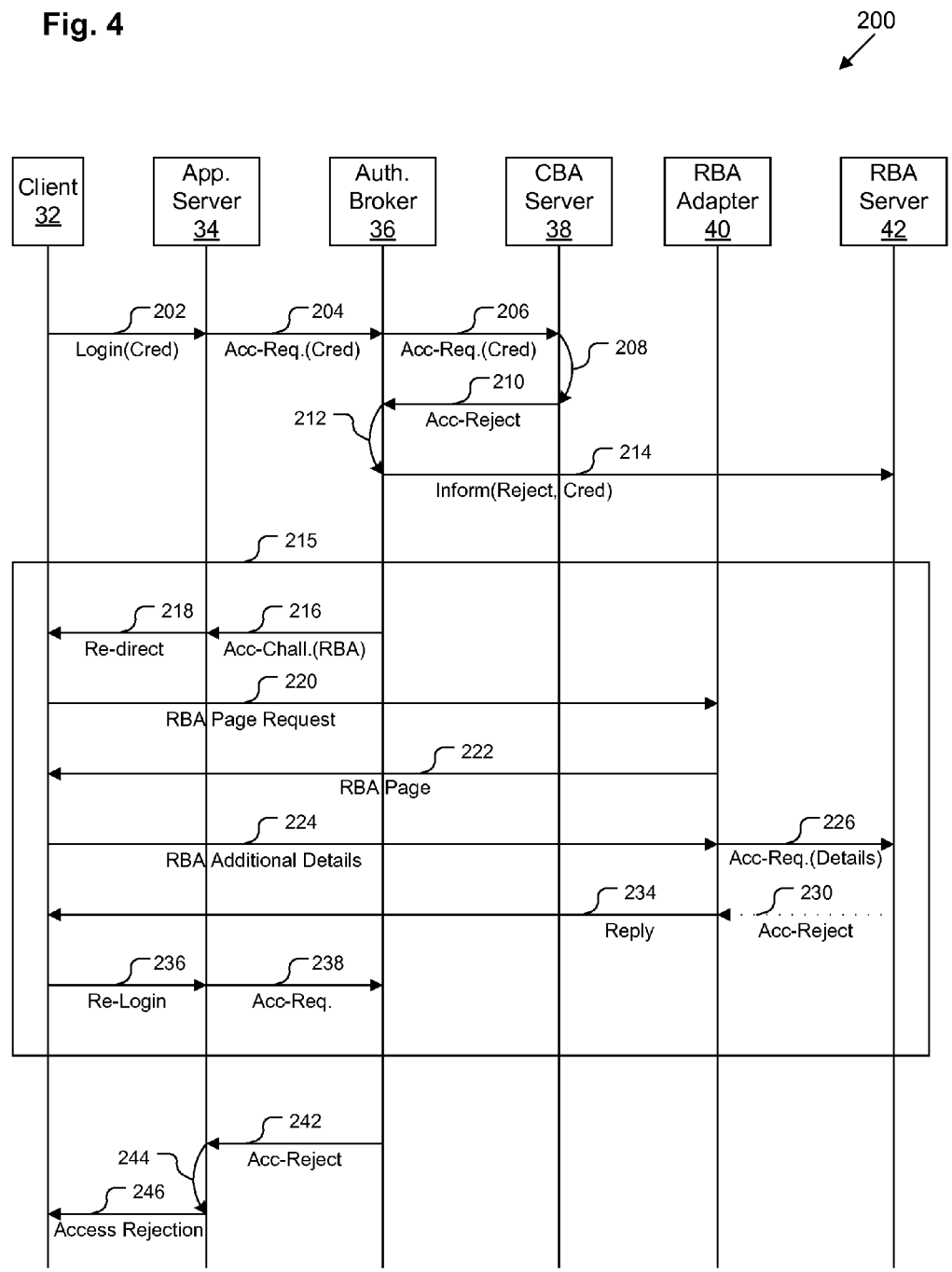
FIG. 4 depicts an example method of various embodiments.
Figure 5:
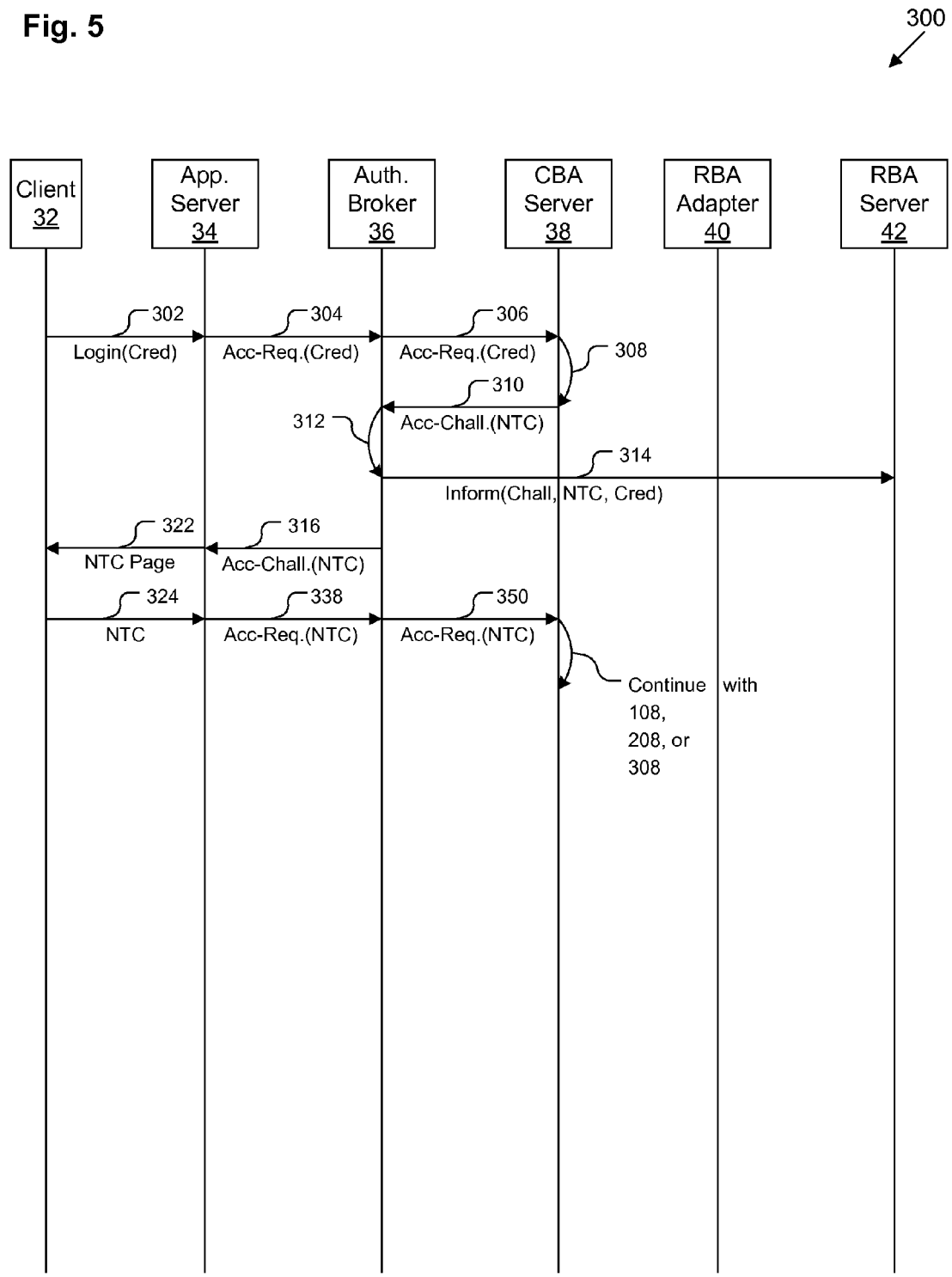
FIG. 5 depicts an example method of various embodiments.

FIGS. 3-5 illustrate the operation of system 30 in detail according to various embodiments. It should be understood that any time a piece of software, such as, for example, login client 33 or session broker 68, is described as performing a method, process, step, or function, in actuality what is meant is that the device on which the piece of software is running (e.g., authentication broker 36 via operation of processor 54) performs the method, process, step, or function when executing that piece of software.

FIG. 3 illustrates, as method 100, the operation of system 30 when the CBA server 38 initially grants authentication to a login attempt. When a user 31 desires to login to a service 35 or resource 37 via application server 34, user 31 initiates a login attempt via login client 33 on client 32 by providing user credentials (e.g., username, password, and/or OTP). Client 32 then sends a login message 102 to application server 34 containing the credentials. Upon receipt, application server 34 sends the credentials to the authentication broker 36 by sending a RADIUS access-request message 104 with the credentials as parameters. Request path 62 of the authentication broker 36 receives the access-request message 104 and forwards the request on to the CBA server 38 as message 106. CBA server 38 performs an authentication function 108 in order to decide whether to accept, reject, or challenge the login attempt according to well-known procedures. In the scenario of FIG. 3, CBA server 38 positively accepts the authentication attempt and proceeds to sends a RADIUS access-accept message 110 back to the authentication broker 36. Response path 64 of the authentication broker 36 receives the access-accept message 110, which is intercepted by interception module 66 for processing 112 by session broker 68. Session broker 68 then directs SOAP client 70 to send decision information 114 to the RBA server 42, the decision information 114 including the user credentials and an indication that the authentication request was accepted by the CBA server 38. Session broker 68 also modifies the incoming access-accept message 110 to create a RADIUS access-challenge message 116, containing a parameter indicating that an RBA challenge should be performed. Session broker 68 then sends the access-challenge message 116 to the response path 64 so that the access-challenge message 116 can be sent to the application server 34 via network interface 52.

Upon receiving the access-challenge message 116 with the parameter indicating that an RBA challenge should be performed, application server 34 sends a re-direct command 118 to the login client 33 directing the login client 33 towards RBA adapter 40. Login client 33 sends a page request 120 for an RBA page to RBA adapter 40, which responds by returning an RBA page 122 to the login client 33. RBA page 122 includes various queries for additional information that may be useful in performing RBA. Some of these queries may be automatically responded to by login client 33, while other queries may be responded to by user 31. These additional details 124 in response to the queries are then sent from login client 33 to RBA adapter 40. RBA adapter 40 is then able to create and send an access request message 126 containing the additional details 124 to the RBA server 42 for performance of RBA 128. The RBA 128 includes either a positive or a negative determination based on a real-time risk assessment of the login attempt in light of the additional details 124 and the previously-received decision information (as well as other stored information regarding previous login attempts by the same user 31 or received from the same client 32). RBA server 42 then sends an access response message 130 indicating whether the RBA was positive or negative back to the RBA adapter 40. RBA adapter 40 then informs authentication broker 36 (typically indirectly via depository server 44) of the RBA access decision 132. RBA adapter 40 also sends a reply page 134 back to the login client 33. In some embodiments, reply page 134 only includes a hidden indication of whether the RBA was positive or negative so that the login client 33 does not display that information to the user 31. In other embodiments, reply message 134 may not even include any information about the RBA decision at all, the reply message 134 merely directing the login client 33 to reply to the application server 34 in response to the re-direct command 118. In any case, login client 33 sends a re-login request message 136 to the application server 34. Application server 34 then sends a RADIUS access-request message 138 to the authentication broker 36.

Since the authentication broker 36 already knows what the result of the RBA authentication was (via RBA access decision 132 from RBA adapter 40 or depository server 44), authentication broker 36 is able to easily process the access-request message 138 in processing step 140. As long as both the CBA and the RBA were both positive, the login attempt is successful, and response path 64, under control of session broker 68, sends a RADIUS access-accept message back to application server 34 as the access response 142. However, if one or both of the CBA and the RBA were negative, then response path 64, under control of session broker 68, sends a RADIUS access-reject message back to application server 34 as the access response 142. Application server 34 performs a processing operation 144 on the access response 142, and sends an appropriate access decision 146 back to the login client 33, so that the user 31 is informed whether the login attempt was successful or not. If successful, user 31 is then able to access the service 35 or resource 37 as initially desired.

FIG. 4 illustrates, as method 200, the operation of system 30 when the CBA server 38 initially rejects authentication for a login attempt. When a user 31 desires to login to a service 35 or resource 37 via application server 34, user 31 initiates a login attempt via login client 33 on client 32 by providing user credentials (e.g., username, password, and/or OTP). Client 32 then sends a login message 202 to application server containing the credentials. Upon receipt, application server 34 sends the credentials to the authentication broker 36 by sending a RADIUS access-request message 204 with the credentials as parameters. Request path 62 of the authentication broker 36 receives the access-request message 204 and forwards the request on to the CBA server 38 as message 206. CBA server 38 performs an authentication function 208 in order to decide whether to accept, reject, or challenge the login attempt. In the scenario of FIG. 4, CBA server 38 positively rejects the authentication attempt and proceeds to sends a RADIUS access-reject message 210 back to the authentication broker 36. Response path 64 of the authentication broker 36 receives the access-reject message 210, which is intercepted by interception module 66 for processing 212 by session broker 68. Session broker 68 then directs SOAP client 70 to send decision information 214 to the RBA server 42, the decision information 214 including the user credentials and an indication that the authentication request was rejected by the CBA server 38.

At this point, in one embodiment (described in further detail in connection with FIG. 6, below), operation skips over the steps of box 215 down to the bottom of FIG. 4, and response path 64 merely forwards the access-reject message 210 unmodified as access reject message 242 to application server 34. Application server 34 performs a processing operation 244 on the access response 142, and sends an access rejection message 246 back to the login client 33, so that the user 31 is informed that login attempt was unsuccessful.

Alternatively, in another embodiment (associated with FIG. 7, below), operation proceeds with the contents of box 215 in order to initiate RBA upon performing processing 212 and sending decision information 214. There are two reasons why it may be advantageous to operate in this manner. First, it allows collection of additional details by the RBA adapter 40 that would not be available to the RBA server 42 for future RBA decisions were the contents of box 215 omitted. Second, operation from the perspective of the user 31 appears the same whether or not the CBA server 38 accepted or rejected the authentication, thereby preventing the user 31 from learning whether any rejection was issued by the CBA server 38 or the RBA server 42. This hiding of information can increase system security by giving less direction to a fraudster seeking to impersonate a valid user 31.

In box 215, upon performing processing 212 (in response to receiving the access-reject message), session broker 68 modifies the incoming access-reject message 210 to create a RADIUS access-challenge message 216, containing a parameter indicating that an RBA challenge should be performed. Session broker 68 then sends the modified access-challenge message 216 to the response path 64 so that the modified access-challenge message 216 can be sent to the application server 34 via network interface 52. Upon receiving the modified access-challenge message 216 with the parameter indicating that an RBA challenge should be performed, application server 34 sends a re-direct command 218 to the login client 33 directing the login client 33 towards RBA adapter 40. Login client 33 sends a page request 220 for an RBA page to RBA adapter 40, which responds by returning an RBA page 222 to the login client 33. RBA page 222 includes various queries for additional information that may be useful in performing RBA. Some of these queries may be automatically responded to by login client 33, while other queries may be responded to by user 31. Additional details 224 in response to the queries are then sent from login client 33 to RBA adapter 40. RBA adapter 40 is then able to create and send an access request message 226 containing the additional details 224 to the RBA server 42. In response to receiving the access request message 226, RBA server 42 may immediately respond with a rejection message 230, since RBA server 42 already knows (from decision information 214) that the CBA server 38 has already rejected the authentication. RBA adapter 40 then sends a reply page 234 back to the login client 33. In some embodiments, reply page 234 only includes a hidden indication of whether the RBA was positive or negative so that the login client 33 does not display that information to the user 31. In other embodiments, reply message 234 may not even include any information about the RBA decision at all, the reply message 234 merely directing the login client 33 to respond to the application server 34. In any case, login client 33 sends a re-login request message 236 to the application server 34. Application server 34 then sends a RADIUS access-request message 238 to the authentication broker 36. Since the authentication broker 36 already knows that the CBA server 38 has already rejected the authentication, session broker 68 knows that the proper response to the access-request message 238 is to issue an access-reject message 242 as described previously.

Although communication of the additional details 224 from the RBA adapter 40 to the RBA server 42 has been described as being done via an access request message 226 with a corresponding rejection message 230 being sent back, this may not be necessary in embodiments in which the RBA adapter 40 is already aware that the CBA server 38 has already rejected the authentication. In such embodiments, the additional details 224 from the RBA adapter 40 to the RBA server 42 may be sent as an informational message rather than as an access request message and the rejection message 230 is not sent, since the RBA adapter 40 is already aware that the CBA server 38 has already rejected the authentication.

FIG. 5 illustrates, as method 300 the operation of system 30 when the CBA server 38 initially responds to a login attempt with a challenge. When a user 31 desires to login to a service 35 or resource 37 via application server 34, user 31 initiates a login attempt via login client 33 on client 32 by providing user credentials (e.g., username, password, and/or OTP). Client 32 then sends a login message 302 to application server 34 containing the credentials. Upon receipt, application server 34 sends the credentials to the authentication broker 36 by sending a RADIUS access-request message 304 with the credentials as parameters. Request path 62 of the authentication broker 36 receives the access-request message 304 and forwards the request on to the CBA server 38 as message 306. CBA server 38 performs an authentication function 308 in order to decide whether to accept, reject, or challenge the login attempt. In the scenario of FIG. 5, CBA server 38 challenges the login attempt by sending a RADIUS access-challenge message 310 back to the authentication broker 36. The access-challenge message 310 includes parameters that indicate what kind of challenge is being issued. For example, if the CBA server 38 is challenging the login attempt by requiring a next token code (e.g., user 31 is to be directed to enter a new OTP from the token since the previously-entered OTP was too old), the parameters of the access-challenge message 310 would include an indication that an NTC ("Next Token Code") challenge is being issued. Response path 64 of the authentication broker 36 receives the access-challenge message 310, which is intercepted by interception module 66 for processing 312 by session broker 68. Session broker 68 then directs SOAP client 70 to send decision information 314 to the RBA server 42, the decision information 314 including the user credentials and an indication that the authentication request was challenged by the CBA server 38 with an NTC request. Session broker 68 also uses the incoming access-challenge message 310 to create a modified RADIUS access-challenge message 316, containing a parameter indicating that an NTC challenge should be performed. Session broker 68 then sends the modified access-challenge message 316 to the response path 64 so that the modified access-challenge message 316 can be sent to the application server 34 via network interface 52.

Upon receiving the modified access-challenge message 316 with the parameter indicating that an NTC challenge should be performed, application server 34 sends an NTC challenge page 322 (or a CBA challenge page for another type of CBA challenge) to the login client 33. The user 31 is then able to respond to the challenge by entering in a new OTP or other challenge information in order that the login client 33 is then able to send the NTC 324 or other challenge information back to the application server 34. Upon receipt, application server 34 sends the NTC 324 to the authentication broker 36 to be authenticated by sending a RADIUS access-request message 338 with the NTC as a parameter. Request path 62 of the authentication broker 36 receives the access-request message 338 and forwards the request on to the CBA server 38 as message 350. CBA server 38 then performs an authentication function 108, 208, 308 in order to decide whether to accept, reject, or challenge the login attempt, and operation resumes with the step 110, 210, or 310 of methods 100, 200, or 300, respectively, as appropriate.

FIG. 6 illustrates an example method 400 performed by authentication broker 34 according to various embodiments. In step 410, RADIUS proxy 60, at request path 62, receives a login message (e.g., RADIUS access-request message 104, 204, 304) from the application server 34 via network interface 52 upon the user 31 attempting to gain access to a service 35 provided by the application server 34 (or to login to access a resource 37 protected by the application server 34). The login message includes a user credential, such as, for example one or more of a username, password, and OTP included as a parameter within access-request message 104, 204, 304.

In step 420, RADIUS proxy 60, at request path 62, forwards the user credential to the CBA server 38 via the network interface 52 for CBA to be performed by the CBA server 38. Typically, this forwarding involves sending RADIUS access-request message 106, 206, 306 (which may either be an exact copy of RADIUS access-request message 104, 204, 304, respectively, or it may include minor modifications).

In step 430, RADIUS proxy 60, at response path 64, receives an authentication decision message (e.g., RADIUS access-accept message 110, RADIUS access-reject message 210, or RADIUS access-challenge message 310) from the CBA server 38.

In step 440, interception module 66 intercepts the received authentication decision message and sends it to the session broker 68, which directs the SOAP client 70 to send, via the network interface 52, decision information 114, 214, 314 regarding the received authentication decision message to the RBA server 42, the decision information 114, 214, 314 to be used by the RBA server 42 in performing RBA decisions. The decision information 114, 214, 314 includes the user credentials as well as an indication of the authentication decision (positive, negative, or challenge) made by the CBA server 38.

In parallel with step 440, authentication broker 36 also performs one of steps 450, 460, and 470. Session broker 68 determines which of steps 450, 460, 470 to perform based on what kind of authentication decision message has been received.

In step 450, if the authentication decision is positive (e.g., if it is access-accept message 110), then session broker 68 generates a challenge message (e.g., access-challenge message 116) indicating that the application server 34 should initiate RBA to be performed by the RBA server 42 supplementary to the CBA and inserts that challenge message into the response path 64 to be sent to the application server 34 via network interface 52. In response, in step 452, authentication broker 36 receives, at request path 62, a challenge response message (e.g., access-request message 138) from the application server 34 via network interface 52. In some embodiments, the challenge response message includes an indication of what the RBA decision was, while, in other embodiments, the challenge response message includes no indication as to what the RBA decision was (in order to avoid the user 31 finding out what the RBA decision was). Interception module 66 intercepts the challenge message and sends it to the session broker 68, which, in step 454, verifies what the result of the RBA was independently of the application server 34 (for example by contacting depository server 44 to retrieve the RBA decision without any possibility of tampering by the user 31). In step 456, if the verification indicates that the RBA was successful, then, since the CBA was also successful, then session broker 68 generates an acceptance message (e.g., a RADIUS access-accept message) as access response message 142, indicating that the authentication was successful, and inserts that acceptance message into the response path 64 to be sent to the application server 34 via network interface 52, thereby causing application server 34 to grant the user 31 access to the service 35 or resource 37.

In step 460, if the authentication decision is negative (e.g., if it is access-reject message 210), then, in step 466, session broker 68 generates a rejection message (e.g., access-reject message 242) indicating that the authentication was unsuccessful, and inserts that rejection message into the response path 64 to be sent to the application server 34 via network interface 52, thereby causing application server 34 to refuse the user 31 access to the service 35 or resource 37. In some embodiments, prior to performing step 466, in step 462, session broker 68 generates a challenge message (e.g., access-challenge message 216) indicating that the application server 34 should initiate RBA to be performed by the RBA server 42 supplementary to the CBA and inserts that challenge message into the response path 64 to be sent to the application server 34 via network interface 52. In response, in step 464, authentication broker 36 receives, at request path 62, a challenge response message (e.g., access-request message 238) from the application server 34 via network interface 52. At this point, since the session broker 68 knows that the CBA was unsuccessful, it doesn't matter what the result of the RBA was (steps 462 and 464 serving to ensure that the RBA server 42 obtains the necessary additional details 224 and to hide the outcome of the CBA from the user 31 by performing RBA regardless of the result of the CBA), so authentication broker 36 is able to immediately issue a rejection by proceeding to step 466.

In step 470, if the authentication decision is a challenge (e.g., if it is access-challenge message 310), then session broker 68 generates a challenge message (e.g., access-challenge message 316) indicating that the application server 34 should initiate a CBA challenge and inserts that challenge message into the response path 64 to be sent to the application server 34 via network interface 52. Operation then proceeds with step 410, as the authentication broker 36 then receives a challenge response message (e.g., access-request message 338) containing the NTC as the user credentials, the challenge response message then being processed in the same manner as an initial access-request message 204, 304, 404.

FIG. 7 illustrates an example method 500 performed by authentication broker 36 according to various embodiments. It should be understood that method 500 includes a more generalized description of method 400 according to embodiments in which RBA is performed even if CBA is unsuccessful. However, in method 500, being more general, CBA and RBA may be replaced by other authentication techniques.

In step 510, authentication broker 36 receives an authentication request message (e.g., access-request message 104, 204, 304) from an application server 34 seeking to authenticate a user 31 for access to a service 35 (or resource 37) provided by the application server 34.

In step 520, authentication broker 36 communicates with a first authentication server (e.g., CBA server 38) to obtain a first authentication of the user 31 (e.g., using CBA and one or more credentials provided by the user 31). The result of the communication with the first authentication server may be positive, negative, or a challenge.

In step 530, authentication broker 36 communicates with a second authentication server (e.g., RBA server 42) to obtain a second authentication of the user 31 (e.g., using RBA additional details 124, 224 provided by the user 31 to perform RBA). The result of the communication with the second authentication server may be either positive or negative.

The first authentication (step 520) and the second authentication (step 530), although depicted as being done in that order, may actually be performed in parallel or, even, the second authentication (step 530) may precede the first authentication (step 520). Typically, however, the first authentication (step 520) is done first so that the authentication server 36 is able to send decision information 114, 214, 314 regarding the first authentication to the second authentication server for use in the second authentication.

In step 540, authentication broker 36 rejects the authentication request if either (or both) of the first authentication (step 520) and the second authentication (step 530) yield negative results. Otherwise, if both of the first authentication (step 520) and the second authentication (step 530) yield positive results, then authentication broker 36 accepts the authentication request. If the first authentication attempt (step 520) yields a challenge, then the first authentication attempt (step 520) may be repeated until a positive or negative result is reached (or until the second authentication attempt yields a negative result, which would render the result of the first authentication attempt moot).

Upon rejecting the authentication request (see step 540, above), in step 550 authentication broker 36 sends a rejection message (e.g., access-reject message 242) to the application server 34 without informing the application server 34 whether the first authentication (step 520) or the second authentication (step 530) was negative.

Thus, techniques have been described for utilizing an authentication broker 36 for contacting multiple authentication servers 38, 42 and sending information gleaned from a first authentication by a first authentication server 38 to a second authentication server 42 for use by that second authentication server 42. Thus, application server 34 only needs to communicate with a single device—the authentication broker 36—to allow for efficient authentication by two authentication servers 38, 42, the second authentication server being aware of details of the first authentication.

While various embodiments of the present disclosure have been particularly shown and described, it will be understood by those skilled in the art that various changes in form and details may be made therein without departing from the spirit and scope of the present disclosure as defined by the appended claims.

For example, it should be understood that, although reference has been made to the RADIUS protocol, this is by way of example only. Various other authentication protocols, such as, for example, SAML and OAuth, could be used instead with only minor modifications.

As an additional example, it should be understood that, although reference has been made to the SOAP protocol, this is by way of example only. Various other remoting protocols, such as, for example, REST, CORBA, and COM, could be used instead with only minor modifications.

As an additional example, it should be understood that, although the RBA process 120-134, 220-234 has been described as involving one set of queries (within RBA page 122, 222) for additional information and one set of additional details 124, 224, this is by way of example only. In some embodiments, there may be more than one back-and-forth exchanges in which RBA adapter 40 sends several RBA pages 122, 222 to client 32 with various queries and client 32 sends several sets of additional details 124, 224 back to RBA adapter 40. There may also be several exchanges of access request messages 126, 226 and access response messages 130, 230 between RBA adapter 40 and RBA server 42, as needed. As an additional example, it should be understood that although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a computing device, the method comprising:
   receiving, by the computing device from an application server, a login message for a user attempting to gain access to a service provided by the application server, the login message including a user credential for a credential-based authentication (CBA);
   forwarding the user credential by the computing device to a CBA server for the CBA;
   in response to forwarding, receiving, by the computing device, an authentication decision message from the CBA server;
   sending decision information from the authentication decision message received from the CBA server by the computing device to a risk-based authentication (RBA) server, the RBA server being distinct from the CBA server, the decision information to be used by the RBA server in performing RBA decisions;
   if the authentication decision message is positive, then sending a challenge message by the computing device to the application server to initiate RBA to be performed by the RBA server supplementary to the CBA; and
   if the authentication decision message is negative, then sending a rejection message by the computing device to the application server,
   wherein the method further includes:
   receiving, by the computing device, a challenge response message from the application server in response to sending the challenge message to the application server to initiate RBA to be performed by the RBA server supplementary to the CBA;
   verifying, by the computing device, independently of the application server, what the result of the RBA was; and
   if and only if the verification indicates that the RBA was successful, then providing, by the computing device, the application server with a positive authentication of the user for access to the service provided by the application server,
   and wherein verifying what the result of the RBA was independently of the application server includes retrieving an RBA decision message from the RBA server after an RBA adapter has sent user-specific details to the RBA server, the user-specific details including details about the user not available to the application server.

2. The method of claim 1 wherein the method further comprises, if the authentication decision message is neither positive nor negative, then sending a challenge message by the computing device to the application server to initiate a credential-based challenge.

3. The method of claim 2 wherein the method further comprises, by the computing device in response to sending the challenge message to the application server to initiate the credential-based challenge:
   receiving a new user credential for the CBA;
   forwarding the new user credential from the computing device to the CBA server for the CBA;
   in response to forwarding the new user credential, receiving, at the computing device, a new authentication decision message from the CBA server;
   sending new decision information from the new authentication decision message to the RBA server, the new decision information to be used by the RBA server in performing RBA decisions;
   if the new authentication decision message is positive, then sending another challenge message to the application server, the other challenge message to initiate RBA to be performed by the RBA server supplementary to the CBA; and
   if the new authentication decision message is negative, then sending a rejection message to the application server.

4. The method of claim 1 wherein receiving the login message, forwarding the user credential, receiving the authentication decision message, sending the challenge message, and sending the rejection message are each performed according to the Remote Authentication Dial In User Service (RADIUS) protocol, and sending decision information is performed according to the SOAP protocol.

5. The method of claim 1 wherein retrieving the RBA decision message from the RBA server includes communicating with a depository server to retrieve the RBA decision message provided to the depository server by the RBA adapter, the RBA adapter having received the RBA decision message from the RBA server upon the RBA adapter sending user-specific details to the RBA server, the user-specific details including details about the user not available to the application server.

6. The method of claim 1 wherein, if the authentication decision message is negative, then, prior to sending the rejection message by the computing device to the application server:
   sending a challenge message by the computing device to the application server to initiate RBA supplementary to the CBA;
   in response to sending the challenge message to the application server to initiate RBA, receiving, by the computing device, a challenge response message from the application server; and
   in response to receiving the challenge response message from the application server, sending the rejection message by the computing device to the application server, the rejection message lacking any indication which of the CBA server and the RBA server issued a negative authentication decision.

7. An apparatus comprising:
   a network interface;
   memory; and
   a controller, the controller including hardware and software, the controller being configured to:
   receive, via the network interface, from an application server, a login message for a user attempting to gain access to a service provided by a remote application server, the login message including a user credential for a credential-based authentication (CBA);
   forward, via the network interface, the user credential to a CBA server for the CBA;
   in response to forwarding, receive, via the network interface, an authentication decision message from the CBA server;
   send, via the network interface, decision information from the authentication decision message received from the CBA server to a risk-based authentication (RBA) server, the RBA server being distinct from the CBA server, the decision information to be used by the RBA server in performing RBA decisions;
   if the authentication decision message is positive, then send, via the network interface, a challenge message to the application server to initiate RBA to be performed by the RBA server supplementary to the CBA; and
   if the authentication decision message is negative, then send, via the network interface, a rejection message from the computing device to the application server,
   wherein the controller is further configured to:
   receive, via the network interface, a challenge response message from the application server in response to sending the challenge message to the application server to initiate RBA to be performed by the RBA server supplementary to the CBA;
   verify, via the network interface, independently of the application server, what the result of the RBA was; and
   if and only if the verification indicates that the RBA was successful, then provide the application server with a positive authentication of the user for access to the service provided by the application server
   and wherein verifying what the result of the RBA was independently of the application server includes retrieving an RBA decision message from the RBA server after an RBA adapter has sent user-specific details to the RBA server, the user-specific details including details about the user not available to the application server.

8. The apparatus of claim 7 wherein the controller is further configured to:
   if the authentication decision message is neither positive nor negative, then send, via the network interface, a challenge message to the application server to initiate a credential-based challenge.

9. The apparatus of claim 8 wherein the controller is further configured to:
   in response to sending the challenge message to the application server to initiate the credential-based challenge:
      receive, via the network interface, a new user credential for the CBA; and
      forward, via the network interface, the new user credential to the CBA server for the CBA;
   in response to forwarding the new user credential, receive, via the network interface, a new authentication decision message from the CBA server;
   send, via the network interface, new decision information from the new authentication decision message to the RBA server, the new decision information to be used by the RBA server in performing RBA decisions;
   if the new authentication decision message is positive, then send, via the network interface, another challenge message to the application server, the other challenge message to initiate RBA to be performed by the RBA server supplementary to the CBA; and
   if the new authentication decision message is negative, then send, via the network interface, a rejection message to the application server.

10. The apparatus of claim 7 wherein, if the authentication decision message is negative, then, the controller is further configured to, prior to sending the rejection message from the computing device to the application server:
   send, via the network interface, a challenge message from the computing device to the application server to initiate RBA supplementary to the CBA;
   in response to sending the challenge message to the application server to initiate RBA, receive, via the network interface, a challenge response message from the application server; and
   in response to receiving the challenge response message from the application server, send, via the network interface, the rejection message from the computing device to the application server, the rejection message lacking any indication which of the CBA server and the RBA server issued a negative authentication decision.

11. A system comprising:
   a client computer running a login client, the client computer being configured to interact with a user;
   an application server configured to:
      receive a login request message from the login client running on the client computer, the login request message having a user credential provided by the user upon attempting to gain access to a service provided by the application server; and
      provide the service to the client computer upon successful authentication of the user;

an authentication broker computer configured to:
  receive the user credential from the application server;
  forward the user credential to a credential-based authentication (CBA) server for CBA;
  in response to forwarding, receive an authentication decision message from the CBA server;
  send decision information from the authentication decision message received from the CBA server to a risk-based authentication (RBA) server, the RBA server being distinct from the CBA server, the decision information to be used by the RBA server in performing RBA decisions;
  if the authentication decision message is positive, then send a challenge message to the application server to initiate RBA to be performed by the RBA server supplementary to the CBA; and
  if the authentication decision message is negative, then send a rejection message to the application server; and
an RBA adapter;
wherein the application server is configured to:
  deny the service to the client computer upon receiving a rejection message from the authentication broker computer; and
  send a redirect command to the login client running on the client computer upon receiving a challenge message from the authentication broker computer to initiate RBA supplementary to the CBA;
wherein the RBA adapter is configured to:
  collect user-specific details including details about the user not available to the application server upon the login client being redirected to the RBA adapter;
  send the user-specific details to the RBA server;
  receive a risk-based decision message from the RBA server in response to sending the user-specific details to the RBA server;
  inform the authentication broker computer of the risk-based decision; and
  direct the login client running on the client computer to respond to the application server.

12. The system of claim 11 wherein the login client running on the client computer, upon being directed to respond to the application server by the RBA adapter, is configured to silently send a response message to the application server without displaying any indication of contents of the risk-based decision message to the user.

13. The system of claim 11 wherein the authentication broker computer is further configured to, if the authentication decision message is a challenge, then send a challenge message to the application server to initiate a credential-based challenge.

14. The system of claim 13 wherein the authentication broker computer is further configured to, in response to sending the challenge message to the application server to initiate the credential-based challenge:
  receive a new user credential for the CBA;
  forward the new user credential to the CBA server for the CBA;
  in response to forwarding the new user credential, receive a new authentication decision message from the CBA server;
  send new decision information from the new authentication decision message to the RBA server, the new decision information to be used by the RBA server in performing RBA decisions;
  if the new authentication decision message is positive, then send a challenge message to the application server to initiate RBA to be performed by the RBA server supplementary to the CBA; and
  if the new authentication decision message is negative, then send a rejection message to the application server.

15. The system of claim 11 wherein the authentication broker computer is further configured to:
  receive a challenge response message from the application server in response to sending the challenge message to the application server to initiate RBA to be performed by the RBA server supplementary to the CBA;
  verify what the result of the RBA was independently of the application server; and
  if the verification indicates that the RBA was successful, then provide the application server with a positive authentication of the user for access to the service provided by the application server.

16. The system of claim 15 wherein
  the RBA adapter, when informing the authentication broker computer of the risk-based decision message, is configured to provide the risk-based decision to a depository server; and
  the authentication broker computer, when verifying what the result of the RBA was independently of the application server, is configured to retrieve the risk-based decision provided to the depository server.

17. The system of claim 11 wherein the authentication broker computer is further configured to, if the authentication decision is negative, then, prior to sending the rejection message to the application server:
  send a challenge message to the application server to initiate RBA to be performed by the RBA server supplementary to the CBA;
  in response to sending the challenge message to the application server to initiate RBA, receive a challenge response message from the application server; and
  in response to receiving the challenge response message from the application server, send the rejection message to the application server, the rejection message lacking any indication which of the CBA server and the RBA server issued a negative authentication decision.

18. The method of claim 1 wherein the decision information sent to the RBA server includes:
  the user credential; and
  an indication of whether the authentication decision message received from the CBA server is positive or negative.

19. The apparatus of claim 7 wherein the decision information sent to the RBA server includes:
  the user credential; and
  an indication of whether the authentication decision message received from the CBA server is positive or negative.

* * * * *